D. E. POUGNET.
APPARATUS FOR THE DISCHARGE OF WATER OR OTHER LIQUIDS IN A SPRAYED FORM OVER COMPARATIVELY LARGE AREAS.
APPLICATION FILED OCT. 5, 1912.

1,102,354.

Patented July 7, 1914.

WITNESSES:
John C. Sanders
Albert F. Neuman

INVENTOR:
Desbarrieres Edouard Pougnet,
By Wm. Wallace White
ATTY.

THE NORRIS PETERS CO., PHOTO-LITHO., WASHINGTON, D. C.

UNITED STATES PATENT OFFICE.

DESBARRIERES EDOUARD POUGNET, OF LONDON, ENGLAND.

APPARATUS FOR THE DISCHARGE OF WATER OR OTHER LIQUIDS IN A SPRAYED FORM OVER COMPARATIVELY LARGE AREAS.

1,102,354.　　　　　Specification of Letters Patent.　　Patented July 7, 1914.

Application filed October 5, 1912. Serial No. 724,048.

*To all whom it may concern:*

Be it known that I, DESBARRIERES EDOUARD POUGNET, a subject of the King of England, residing at 9 Montague street, Russell Square, London, W. C., England, have invented certain new and useful Improvements in Apparatus for the Discharge of Water or other Liquids in a Sprayed Form over Comparatively Large Areas; and I do hereby declare that the following is a full, clear, and exact description of the same.

Agricultural watering as performed by the usual methods of irrigation is not altogether satisfactory. Large amounts of water have to be used, and the small benefit immediately derived by the plants is often attended with disadvantages such as the washing and carrying away by the water of valuable ingredients of the soil. Where water is scarce, large areas have to be left uncultivated solely for the want of water.

The object of this invention is to provide apparatus which shall be capable of throwing water jets, two or more according to the range to be covered, to and over long distances (of not much less than say 80 or 60 feet) from the apparatus, that is to say not merely to a distant spot but also over intermediate distances, and shall subdivide the water into drops of sufficiently small sizes to imitate rain, the subdivided water being distributed as uniformly as possible over the area to be watered. The water will thus be distributed in a most effective way, enabling a larger area to be cultivated and watered with the same amount of water and without undue deterioration of the soil The invention consists in the combination, construction, and arrangements of parts as hereinafter described and as set forth in the claim.

Figure 1:
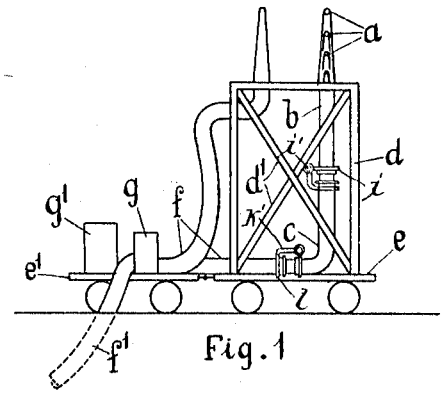
Figure 2:
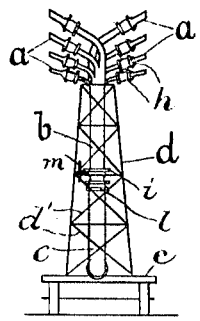
Figure 3:
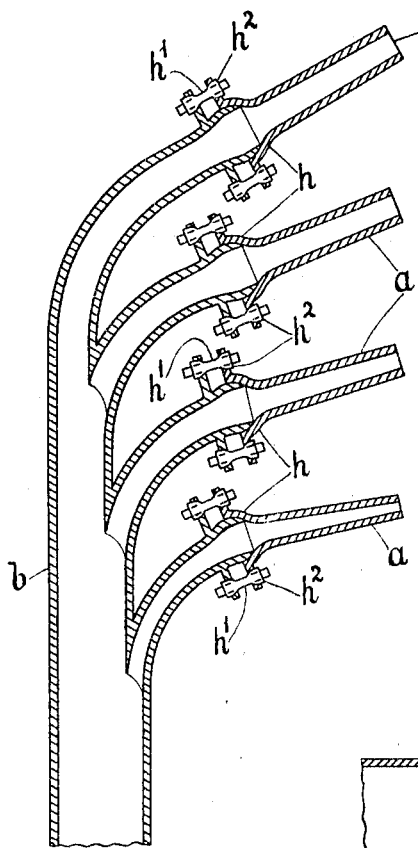
Figure 6:
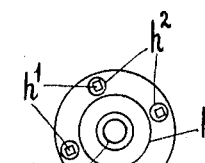
Figure 5:
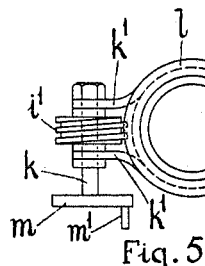
Figure 4:
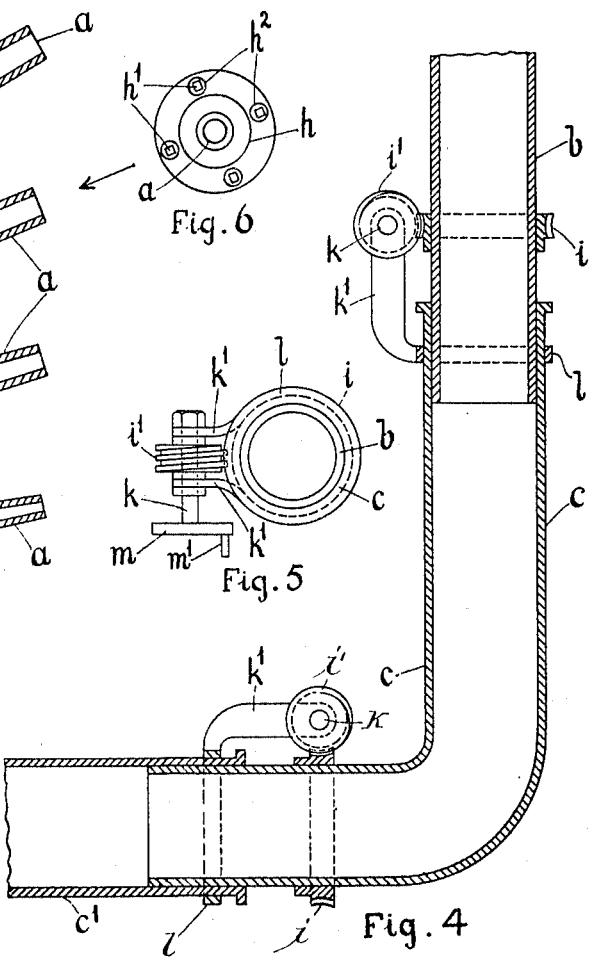

The apparatus is illustrated in the accompanying drawing in which:

Figures 1 and 2 show respectively a diagrammatic elevation and side view of a watering apparatus and carriage. Fig. 3 is a sectional elevation of the upper portion of the apparatus showing the arrangement of the nozzles. Fig. 4 is a sectional elevation of the lower portion of the apparatus showing how the artificial rain is distributed. Fig. 5 is a plan of the upper portion of Fig. 4. Fig. 6 is a side view of one of the nozzles and joints taken in the direction of the arrow.

Figs. 1 and 2 show the general arrangement of the apparatus on a carriage provided with wheels, but equally applicable to other kinds of carriages or transporting means. Two apparatus, one watering at one side and the other at the other side of the carriage, are shown; but two or more such apparatus may be made to play at the same side of the carriage. The apparatus are mounted on a framework $d$ so that the nozzles $a$ are as high as possible above ground, and the framework, which is provided with stiffening bracings $d^1$, is mounted on a carriage $e$. The apparatus are supplied with water under pressure by a pipe line if such is available or preferably by pipes $f$ from a pump $g$ such as a fire engine pump, which is worked by a pumping engine $g^1$; these pipes may be flexible or knee-jointed to enable the carriage to be taken around curves or up and down hill. The pump is supplied with water from a canal, river, reservoir, tank, or any other available source, by a pipe $f^1$. The pumping machinery is mounted on a carriage $e^1$, said carriages $e$ and $e^1$ being drawn or propelled in any suitable manner.

As shown in Fig. 3, several nozzles are grouped together or formed along a substantially vertical pipe $b$ of sufficiently large diameter into which water is admitted under pressure. One row of nozzles $a$ is preferably used, and the nozzles are arranged to play at different ranges by varying their sizes and their inclinations. The size and other details of construction of each nozzle, the water pressure, the velocity of the water, the range attained, and the extent of spraying, are all interdependent and have to be designed or selected accordingly. With a row of nozzles as shown, it is intended to make the upper nozzle work at a long range, say between 200 and 250 feet or more according to pressure available; the next nozzle works over a lesser range, say from 160 and 200 feet, and so on for the other nozzles so as to cover the whole range to be watered. One or more nozzles may play at the same range, and the artificial rains from the various nozzles may overlap to some extent.

The apparatus is adjustable or movable conveniently on horizontal and vertical axes in order to distribute the artificial rain produced by the nozzles. Thus, as shown in Fig. 4, the pipe $b$ is rotatably mounted in a pipe $c$ which is itself rotatably mounted in a pipe $c^1$ leading from or formed in one with the supply pipe $f$.

When the available source of water is localized at some definite point, the artificial rain is distributed over the ground by rotating the apparatus about its vertical axis, that is by rotating the pipe $b$ in the pipe $c$. Whereas, when the available source of water is not so localized or when supply is drawn from a canal or the like, the more convenient arrangement is to cause the carriage on which the apparatus is mounted to travel along the area to be watered.

The pipe $b$ is rotated in the pipe $c$ preferably as follows: A worm wheel $i$, gearing with a worm $i^1$, is fastened on the pipe $b$, the worm being carried by a spindle $k$ supported by brackets $k^1$ attached to a collar $l$ on the pipe $c$. The pipe $b$ can thus be rotated by means of a wheel $m$ carried by the spindle and provided with a handle $m^1$ as shown in Fig. 5. In addition to or simultaneously with the main distribution of the artificial rain obtained as hereinbefore described, the vertical portion of the apparatus may be rocked backward and forward in order to insure that the rain produced by the various nozzles covers the whole range to be watered. The pipe $c$ is then rotated inside the pipe $c^1$ by a worm gear operated by hand in the same manner as in the case of the pipe $b$. Each nozzle is provided with a ball and socket joint to permit its direction to be adjusted as required. These joints $h$ are preferably constructed as shown in Figs. 3 and 6 with four bolts $h^1$ provided with semispherical heads or washers $h^2$. By loosening one bolt and tightening the one diametrically opposite the nozzle is turned about a horizontal or vertical axis as the case may be. In this way the jets may be carefully trained and they may be made to encounter in space if desired.

Although agricultural watering is the only application mentioned above, this invention is also applicable to other similar purposes. The apparatus described may be used for the discharge of chemical fertilizers, petroleums, oils, liquid disinfectants, or other liquids or mixtures of liquids with or without fine powders in suspension, for watering large public areas, for laying dust, for refreshing and purifying the atmosphere, for disinfecting swampy grounds, and generally whenever and wherever such a distribution of liquid is desired.

Claim:

In watering apparatus, the combination of a horizontal supply pipe, a pipe rotatably mounted in said horizontal pipe and bent to a smooth curve so as to end in a vertical position, a vertical pipe rotatably mounted in said vertical portion of said bent pipe and ending in a number of smoothly curved branches of various sizes and inclinations said branches being respectively provided adjacent their extremities with flanges, watering nozzles of varying orifices provided with flanges, means adjustably securing the flanges on said nozzles to said flanges situated on said branches, said branches and nozzles being made in the form of ball and socket joints at their junctions near said flanges, and mechanism for rotating said bent pipe in said horizontal pipe and said vertical pipe in said bent pipe, whereby stretches of artificial rain extending one at a long distance and others at shorter and shorter distances from the apparatus are produced and are uniformly distributed over the area to be watered and may be directed to water over definite fixed ranges so as to cover the whole area extending from the apparatus to the maximum distance reached.

In testimony whereof I have hereunto affixed my signature in presence of two witnesses this nineteenth day of September, 1912.

DESBARRIERES EDOUARD POUGNET.

Witnesses:
O. J. WORTH,
LEOPOLD MANES.